June 14, 1938.  A. L. JOHNSON  2,120,613
MATERIAL GRADER AND CLEANER
Filed July 20, 1932
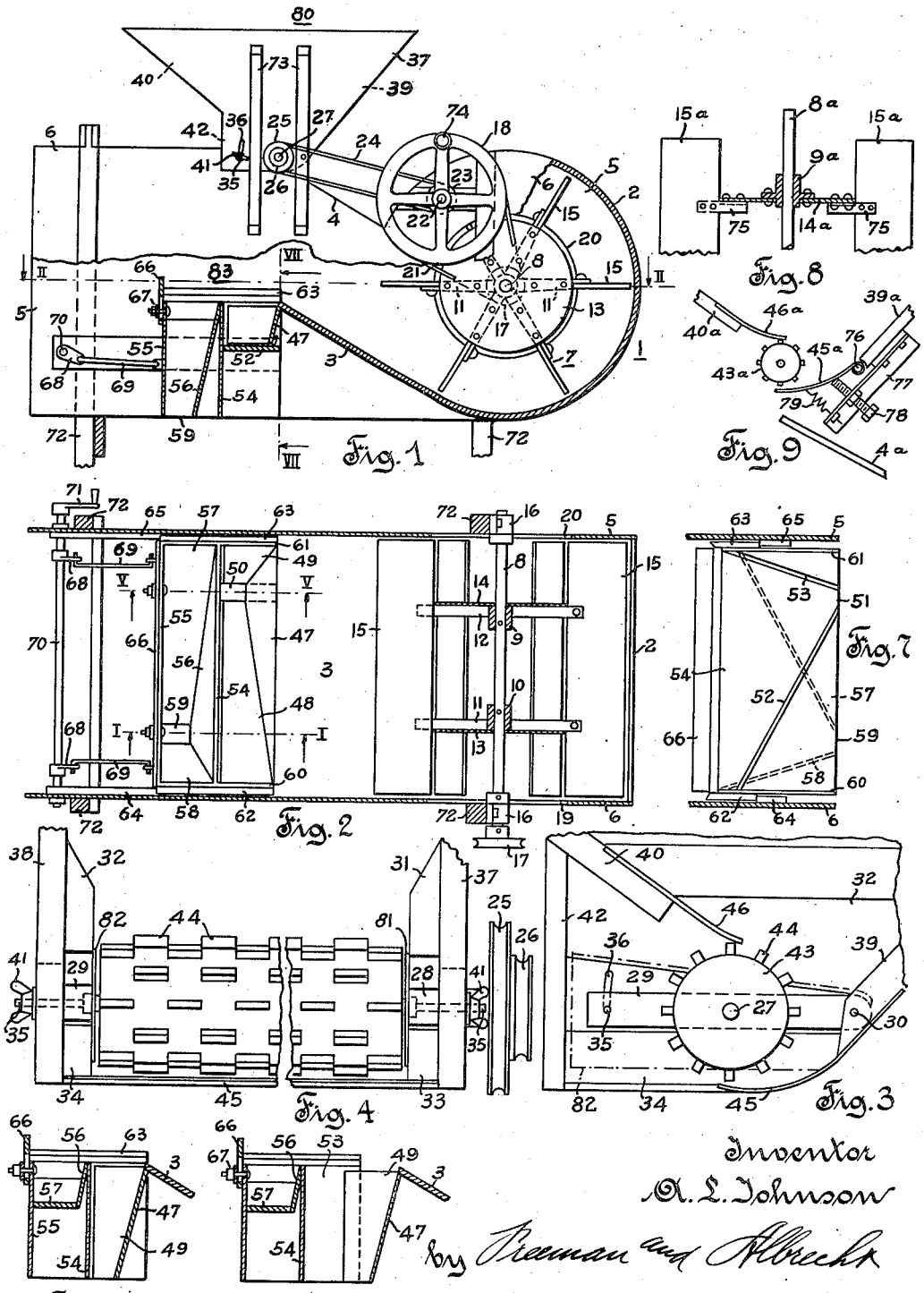

Patented June 14, 1938

2,120,613

UNITED STATES PATENT OFFICE 2,120,613

MATERIAL GRADER AND CLEANER

Arthur L. Johnson, Milwaukee, Wis.

Application July 20, 1932, Serial No. 623,498

14 Claims. (Cl. 209—135)

This invention relates to material graders and cleaners, and more particularly to graders and cleaners for granular material, and is especially adapted for and useful in connection with the grading and cleaning, or both, of seed grains.

One of the objects of the invention is the provision of a grader and cleaner for grains which avoids the necessity for sieves or the like.

Another object is the provision of a grader for seed grains which will grade the seeds grains according to their germinating properties.

Still another object is the provision of a grader for grains which will grade the grains according to their specific gravity.

A further object is the provision of a grader for grains which makes use of an air blast without the cooperation of sieves.

A still further object is the provision of an air blast means in which control of the velocity of the stream lines of the air is effectively and cheaply attained, and more specifically in which the stream lines issuing from a centrifugal fan are of uniform velocity in a plane parallel to the axis of the fan.

Another object is the provision of a grader and cleaner for grains which is very simple and may be built at a low cost.

Still another object is to provide a feeder for grains which will give a uniform flow of grains to be treated by a separating process.

A further object is the provision of adjustable means for receiving the preliminarily separated grains.

Other objects will appear hereinafter as the description of the invention proceeds.

The novel features of the invention will appear from this specification and the accompanying drawing, forming a part thereof, and showing several embodiments of the invention, and all these novel features are intended to be set forth in the appended claims.

In the drawing:

Fig. 1 is a side elevational view of one form of apparatus embodying the invention, a portion thereof being in section, on the line I—I of Fig. 2, and certain parts being removed to more clearly show the interior of the apparatus.

Fig. 2 is a horizontal sectional view taken on the line II—II of Fig. 1, looking in the direction of the arrows.

Fig. 3 is a fragmentary detail view of the hopper portion of the apparatus shown in Fig. 1 with portions removed for the sake of clearness.

Fig. 4 is a fragmentary front view of the detail shown in Fig. 3, with portions removed for the sake of clearness.

Fig. 5 is a fragmentary detail view of that portion of the apparatus which collects the separated grains, taken on the line V—V of Fig. 2, looking in the direction of the arrows.

Fig. 6 is a view similar to Fig. 5 but showing the parts in a different position to show the relative adjustability of the parts.

Fig. 7 is an elevational view, taken at the line VII—VII of Fig. 1 looking in the direction of the arrows, of the movable portion of the receiving means for the separated grains, the relatively stationary portion being removed, and the housing being shown in fragmentary section.

Fig. 8 is a fragmentary detail of a modified form of fan construction.

Fig. 9 is a fragmentary detail of a modified form of feeding means.

Referring to the drawing, the embodiment of the invention shown in Fig. 1 is here shown as including a casing indicated in general by the reference numeral 1. The various portions of the casing will be hereinafter referred to.

The casing is provided with a cylindrical portion 2, which is here shown as merging on its lower side into a tangent wall 3. Above and spaced from the wall 3 is a wall 4. The space between the walls 3 and 4 forms an outlet opening for the cylindrical portion 2.

The casing is provided with side walls 5 and 6. The side wall (6) nearest the observer is broken away as indicated in order to show a fan indicated generally by the reference character 7 disposed in the cylindrical portion 2.

The walls 3, 4, 5, 6 form a conduit leading from the exit opening of the cylindrical portion 2.

The fan 7 is mounted on a shaft 8 carried in suitable bearings 16 which in turn may be carried by the side walls 5, 6 respectively. The shaft 8 is provided with hubs 9, 10 which each carry a plurality of spokes 11, 12 respectively. The spokes 11, 12 serve as a mounting for fan blades 15, here shown as six in number. The number of blades may of course be varied to suit conditions.

In the embodiment shown in Figs. 1 and 2 the axial length of the cylindrical casing 2, and consequently of the fan blades 15, is substantially the same as the diameter of the cylindrical portion 2.

In the embodiment illustrated both of the end walls 5, 6 are provided respectively with inlet openings 20 and 19, so that air may flow through these openings into the respective ends of the fan.

Mounted transversely to the shaft 8 are here shown two baffles 13, 14 which are disc shape and are here shown as conveniently fastened by rivets or otherwise to the spokes 11, 12 respectively.

Whereas in the illustrated embodiment the axial length of the housing is substantially the same as the diameter of the cylindrical portion 2, and two inlet openings 19, 20 are provided one at each end of the fan, the baffles 13 and 14 are so positioned on the shaft 8 that a given baffle is at a distance away from the nearest inlet opening such that that distance is substantially one quarter of the axial length of the housing. As will appear from a consideration of the operation of the apparatus, to be hereinafter described, the position of the baffles 13, 14 may be varied depending upon the value of other factors such as the relation between the axial length of the housing and the diameter thereof, the diameter of the inlet openings 19, 20, and so on.

The diameter of the openings 19, 20 is here shown as slightly larger than that of the discs 13, 14, that is, slightly larger than one half the diameter of the cylindrical portion 2.

The shaft 8 is provided with a sheeve 17 through which it may be rotated as for example from a sheeve 18 by means of a belt 21 disposed in the grooves of the sheeves.

The sheeve 18 is here shown as carried by a shaft 22 which may be in turn carried in a bearing (not shown) supported by the end wall 6. The sheeve 18 is here shown as provided with the crank handle 74 for manually rotating the same, but it will of course be obvious that if desired any source of power may be utilized with suitable connections.

The shaft 22 is also provided with a smaller sheeve 23 which may be connected by a belt 24 to either a sheeve 25 or a sheeve 26 both of which latter are carried by a shaft 27 which is the driving means for a feeder as will more fully appear. The sheeve 25 is larger than the sheeve 26 so that when the shaft 22 is operated to drive the fan 7 at a particular speed, the shaft 27 may be driven at a lower or higher speed depending upon whether the belt is on the sheeve 25 or 26. In order to compensate for the difference in length of the belt 24 necessary when the belt is on either the sheeve 25 or 26, the belt 24 may be of the extensible and contractible variety, or different belts may be used, or any other means for compensating for such difference in length may be utilized as are well known to those skilled in the art.

Referring now more particularly to Figs. 3 and 4 and in connection with the feeder roll which is carried by shaft 27, the shaft 27 is journaled at its ends in two levers 28, 29 respectively. The lever 29 is shown in side view in Fig. 3 and as pivoted on a pin 30. The pin 30 may be carried by a side wall 38 constituting one wall of a hopper indicated generally by numeral 80 in Fig. 1. In like manner the lever 28 (see Fig. 4) is carried by a pin, said pin being similarly supported by an end wall 37 of the hopper. The wall 37 and the lever 28 have been removed in Fig. 3 to more clearly show the parts.

The hopper 80 may be braced by members 73 fastened to the end walls 37, 38 and the casing proper.

In order to prevent grains from piling up on and interfering with the manipulation of the levers 28—29, filler blocks 31, 32 are provided and these blocks may be fastened in any suitable manner to the end walls 37, 38 respectively. For a like purpose filler blocks 33, 34 are provided below the levers 28, 29 respectively. The filler blocks 31, 32 have been removed in Fig. 3.

A threaded stud 35 is carried by the lever 29 and projects through a slot 36 in the end wall 38 of the hopper. A wing nut 41 is in threaded engagement with the stud 35 and serves both as a lifting means and as a fastening means for the left hand end of the lever 29 as viewed in Fig. 3. The lever 28 is provided with a stud similar to 35 extending through wall 37 and operable in the manner already stated in connection with the stud 35 (see Figs. 1 and 4).

The shaft 27 carries a feeder roll 43 which is here shown as provided with radially projecting lugs 44. The lugs in a given axial line are spaced apart and the lugs on an adjacent axial line are also spaced apart but staggered with respect to the first named lugs. The axial length of a given lug is preferably the same as the axial space between two lugs on an adjacent axial line of lugs.

The cross section of the lugs 44 is shown in Fig. 3 as nearly rectangular though slightly tapering radially outward, and if desired the taper may be increased so that the lugs are substantially triangular in section.

If desired a protecting plate 81 may be interposed between the blocks 31, 33 and the end of feeder roll 43. The shaft 27 passes through a hole in plate 81 and the plate is shiftable with the shaft. A similar plate 82 may be provided between the blocks 32, 34 and the other end of the roll 43.

The hopper 80 is provided with oppositely directed chute walls 39 and 40 which together with the end walls 37 and 38 form the hopper proper. Extending downwardly from the chute wall 40 is a wall 42 (see Fig. 3) which serves to enclose the left hand end of the feeder mechanism as viewed in Fig. 3.

The lower edge of the chute wall 39 is here shown as extended, by means of an apron 45, below the feeder roll 43. This apron is preferably stiff and may be made of any suitable material. The lower edge of the chute wall 40 is here shown as extended by means of an apron 46 and this apron is preferably of flexible material such as leather or rubber or any other suitable flexible material and is here shown as in contact with the lugs 44 at the upper surface of roll 43.

Besides serving to form a barrier for grain, the apron 46 is moved up and down slightly by the lugs 44 and so serves to agitate the grains and causes them to feed more uniformly.

It will be observed that the lower edges of the filler blocks 31, 33, and similarly the lower edges of blocks 32, 34, are so formed as to provide V shaped pockets in which the levers 28 and 29 respectively may be swung up and down. When the levers 28, 29 are swung upwardly from the position shown in Fig. 3 the shaft 27 will be raised and hence relative adjustment as between the outer surface of the feeder roll 43 and of course the lugs 44, may be secured with respect to the apron 45. Such adjustment may be made depending upon the size of grains it is desired to feed through the apparatus. When the feeder roll 43 is raised the apron 46 of course remains in contact with the lugs 44 but is flexed upwardly.

While adjustment of the roll 43 serves to accommodate substantially all seed grains, slower feeding with the same roll may be accomplished by reducing the ratio between the speed of shaft 22 and that of shaft 27, as by putting the belt 24 on the large sheeve 25.

An adjustable receiving means 83 which may be best seen in sectional elevation in Figs. 1, 5 and 6, and in plan view in Fig. 2, comprises a stationary chute 47 which may be fastened to the wall 3. Fastened transversely to the chute 47 are chute walls 48 and 49, which are spaced apart at their lower edges to form an opening 50. The opening 50 registers with an opening 51 which is formed by the lower edges of two movable chute walls 52, 53 (see also Fig. 7). The walls 52, 53 may be fastened to a vertical division wall 54 and are in sliding relation to walls 48, 49. Another vertical wall 55 spaced from wall 54 is provided to form the end walls of a bin in which a chute wall 56 is fastened to the wall 54 and the chute walls 57, 58 are fastened to both the wall 56 and the wall 55. The lower ends of the chutes 58, 57 are spaced apart to form an opening 59 (see Figs. 1, 2 and 7). Vertical side walls 60 and 61 may be provided but are not essential since they do not act as inner walls for the bins.

Lugs 62 and 63 may be fastened in the embodiment shown to the side walls 60 and 61 respectively. The lugs 62, 63 rest respectively on rails 64, 65 which serve at the same time to support the lugs 62, 63 and consequently the movable portion of the receiving means. The rails 64, 65 may be suitably fastened to the side walls of the main casing 6 and 5, respectively.

It will be observed that Fig. 7 is an end elevational view, at the line VII—VII of Fig. 1 looking in the direction of the arrows, of the movable portion of the receiving means, the wall 3 of the conduit and also the chute walls 47, 48 and 49 being removed so that the movable portion of the receiving means may be seen.

In order to adjust the vertical confines of the receiving means, a flash board 66 is provided. The board 66 is suitably adjustably fastened to the end wall 55 as by means of threaded bolts and nuts, the bolts passing through vertical slots in the flash board.

One form of adjusting means for the movable portion of the receiving means is shown comprising a pair of cranks 68 mounted on a shaft 70. The cranks 68 have pivotally connected thereto rods 69 in turn pivotally connected to brackets on the wall 55. The shaft 70 may be operated by means of a hand lever 71 preferably disposed on the outside of the main casing, and suitably set in any desired position.

The main casing may be supported by four vertical supports 72 and the length of these supports below the lower edge of the receiving means is such that bushel baskets or any other containers it may be desired to utilize may be slid underneath the openings 50 and 59 respectively.

Referring to Figs. 5 and 6, Fig. 5 is a fragmentary view showing the receiving means in section along the line V—V of Fig. 2 looking in the direction of the arrows. Fig. 6 is a similar view but with the movable portion of the receiving means moved toward the left, thereby changing the general area of the receiving means and also the position of the bin with which the opening 59 is connected. A modified form of fan construction is shown in Fig. 8, the fan blades 15a being shown fragmentarily as also the shaft. One of the supporting means for the blades is shown comprising the hub 9a to which is fastened a disc 14a. The fan blades may be fastened to the disc by means of angle irons 75. In this construction the support of the fan blades 15a also serves as a baffle, the disc 14a corresponding to the baffle 14 of Figs. 1 and 2 for example.

A modified means for adjusting the relative position of the feeder roll and the lower apron is shown fragmentarily in Fig. 9. The parts which correspond to the parts shown in Fig. 3 bear the same reference numerals but with the addition of the suffix-letter a. The apron 45a instead of being fastened rigidly to the chute 39a is formed with a hinged end pivoted on a pintle 76. The pintle 76 may be carried at its ends by the side walls 37, 38 of the hopper. An angle iron 77 is here shown as fastened to the chute wall 39 and is provided with a set screw 78 which bears against the apron 45a. A spring 79 may if desired be provided to hold the apron 45a against the end of the set screw 78. It is obvious that when the set screw 78 is adjusted, the distance between the feeder roll 43a and the apron may be either increased or decreased.

The operation of the apparatus is as follows.

Assuming that it is desired to grade and clean seed grain such as oats, barley, wheat, and so on, the grain is first dumped into the hopper 80. By reason of the construction of the feeder mechanism the grain will not run out of the hopper until the feeder roll 43 is rotated. This is a distinct advantage particularly in hand operated machines such as are usually found on farms. After the grain has been dumped into the hopper the sheeve 18 is rotated by means of the handle 74 thereby causing rotation of the feeder roll 43 and at the same time rotation of the fan 7. By reason of the construction of the feeder roll a uniform curtain of grains is fed over the edge of the apron 45 whereupon it proceeds to drop toward the receiving means.

As the fan rotates air is taken into the casing through the openings 19 and 20 and proceeds inward axially and also radially outwardly through the space between the fan blades, from which it proceeds eventually into the conduit 3, 4. It may be noted here that the area of the two openings 19, 20 is preferably substantially the same as the area of conduit 3, 4.

By reason of the baffles 13 and 14 the air cannot rush through the openings 19 and 20 clear to the center of the shaft 8 to be there thrown radially outward. In the absence of the baffles the quantity of air and the velocity of the stream lines of the radially outwardly flowing air would be far greater in the longitudinal center of the fan than at the longitudinal outer edges thereof. The baffles 13 and 14 provide that the quantity and velocity of the stream lines at the longitudinal outer edges of the fan will be increased with respect to the quantity and velocity at the longitudinal center of the fan. The air moving in stream lines with radially outward components as it reaches the radially inner edges of the fan blades between the baffle 14, say, and the wall 5, moves substantially radially outwardly near the inside of the wall 5, and the stream line adjacent the baffle 14 moves not only outwardly but also axially inwardly between the fan blades to proceed toward the longitudinal center of the fan blades where it meets air coming from adjacent the baffle 13. Between the two positions hereinbefore referred to stream lines proceed from the space whose axial limits are defined by the baffle 14 and the inner side of wall 5, to all points at the outer edges of the fan blades respectively along and between the longitudinal center of the fan blades 15 and the inner side of wall 5. The same is true with respect to air fed to the fan blades from the space between the baffle 13 and the inner side of wall 6 and distributed to the outer edges of the fan blades from the ends thereof near wall 6 to the longitudinal center thereof.

It has been found by test that the velocities of the respective stream lines in a plane transverse to the curtain of falling grains are substantially equal. Consequently the grains falling from the outermost ends of the feeder roll 43 have applied thereto a moving stream of air of substantially the same velocity as the grains falling from the longitudinal center of the feeder roll 43. It is obvious that this is important for the reason that if the velocities referred to are not substantially equal grains falling from the longitudinal center of the apron 45 would have a greater force applied thereto than grains falling from the longitudinal edges of the apron 45, or elsewhere along the axis of the feeder roll, and consequently grains of the same value would drop not only toward the right of partition 54 as viewed in Figs. 1 and 2 but also to the left of that partition. Thus grains of equal value would proceed toward openings 50 and 59 and therefore no proper grading of the grains could be secured. However, where the applied velocities of the stream lines are substantially equal all along the width of the falling curtain as hereinbefore set forth the heavy kernels of grain will drop into the bin with which the opening 50 is connected and the lighter kernels will drop into the bin with which the opening 59 is connected and thus the different grades of grain will proceed to the different containers placed under those respective openings.

It is clear of course that if the grain contains chaff the chaff will be blown entirely clear of the flash board 66, and that if the grain is all of one grade but contains chaff all of the grain may be collected in one of the bins and the chaff will be blown clear of both of the bins.

By reason of the fact that the conduit 3, 4 slants upwardly the stream lines of air have an upward component acting against the falling grains and more time is given for the stream of air to act upon the grains and the separating process is more effectively accomplished. Furthermore, by reason of the fact that the wall 3 is furthest from the axis of the fan the velocity of the stream lines of air increases progressively in planes parallel to the wall 4 and respectively below each other to a highest velocity in a plane adjacent to the wall 3, and thus when the grains are falling most rapidly they are acted upon by stream lines of the higher velocity, it being of course obvious that at the moment that the grains fall over the edge of the apron 45 their velocity is substantially zero and increases as the grains fall toward the receiving means.

Depending upon the size and other characteristics of the grains which it is intended to grade or clean, the general horizontal area of the receiving means may be changed by adjusting the movable portion thereof, as the hand lever 71. The minimum and maximum adjustments are shown in Fig. 5 and Fig. 6 respectively. If for example the grain is in general of light character it is desirable that the dividing wall 54 be further away from the fan. Within limits some adjustment may be secured by the operator by changing the rate of rotation of the sheeve 18 and observing the trajectory of the falling grains.

It has been found that the individual kernels of certain seed grains vary considerably in weight. Kernels of the same size and outward appearance may be heavier or lighter than average. The heavier kernels it has been found are the ones that germinate the best. That is, as between a sowing from grain running a certain number of pounds per bushel and the same kind of grain but running a greater number of pounds per bushel, the heavier kernels will germinate in higher percentage and give a much better stand of grain. It is of course obvious that kernels of the same size but of different weights cannot be graded by running them through a sieve. However, with the present invention the heaviest kernels will fall into the bin nearest the fan and the lighter kernels will fall in a bin further away from the fan, resulting in very effective grading of the kernels.

It is clear that the invention is not limited to the employment of two receiving bins.

It should be understood that it is not desired to limit the invention to the exact details of construction shown and described, for various modifications may occur to persons skilled in the art.

I claim:

1. In combination: means for producing a curtain of falling grains; means for blowing air transversely across said curtain comprising an air blower having a casing, a centrifugal fan in said casing, inlet openings in opposite sides of said casing, surrounding the axis of said fan, baffles spaced axially from said openings and from each other within said casing, said baffles extending only from the radially inner edges of the vanes of said fan toward the axis thereof; and means for receiving a predetermined portion of said falling grains.

2. In combination: means for producing a curtain of falling grains; means for blowing air transversely across said curtain comprising an air blower having a casing, a centrifugal fan in said casing, an inlet opening in said casing surrounding the axis of said fan, means displaced from the axial center of said fan for retarding the axial inward flow of air through said opening along said axis; and means for receiving a predetermined portion of said falling grains.

3. In combination: means for producing a curtain of falling grains; means for blowing air transversely across said curtain comprising an air blower having a casing, a centrifugal fan in said casing, inlet openings in opposite sides of said casing surrounding the axis of the fan, means displaced from the axial center of said fan for retarding the axial inward flow of air through said openings, and along said axis; and means for receiving a predetermined portion of said falling grains.

4. In combination: means for producing a curtain of falling grains; means for blowing air transversely across said curtain comprising an air blower having a casing, a centrifugal fan in said casing, inlet openings in opposite sides of said casing surrounding the axis of the fan, said fan including radial vanes extending axially, the radial inner edges of said vanes being spaced from the axis of the fan, circular inlet openings in opposite sides of said casing surrounding the axis of said fan, said openings having a diameter approximately equal to the diameter of said space within the inner edges of said vanes, circular baffles within said casing spaced axially from said openings and from each other and having a diameter approximately equal to said openings; and means for receiving a predetermined portion of said falling grains.

5. In combination, a casing, a centrifugal fan in said casing, said fan including radial vanes extending axially, the radial inner edges of said vanes being spaced from the axis of the fan, circular inlet openings in opposite sides of said casing surrounding the axis of said fan, said openings having a diameter approximately equal to the diameter of said space within the inner edges of said vanes, circular baffles within said casing spaced axially from said openings and from each other and having a diameter approximately equal to said openings.

6. In combination: a substantially cylindrical casing the length of which is approximately equal to its diameter, a centrifugal fan in said casing, said fan including radial vanes extending axially, the radial inner edges of said vanes being spaced from the axis of said fan, said casing having inlet openings in opposite sides thereof surrounding the axis of said fan, said openings having a diameter approximately equal to the diameter of said space within the inner edges of said vanes, a pair of circular baffles within said casing spaced axially from said openings, said baffles having a diameter approximately equal to that of said openings and each baffle being spaced from the opening nearest to it an axial distance approximately equal to one fourth of the length of said casing.

7. In combination, means for producing a curtain of falling grains, means for blowing air transversely across said curtain, means for receiving a predetermined portion of said falling grains, said receiving means including a pair of longitudinal end walls, and a pair of telescoping downwardly inclined walls leading to an outlet opening said telescoping walls being associated with said longitudinal walls respectively.

8. In combination: means for producing a curtain of falling grains; means for blowing air transversely across said curtain comprising an air blower having a casing, a centrifugal fan in said casing, an inlet opening in said casing surrounding the axis of said fan, said inlet opening serving to feed air both to a part of said fan relatively adjacent said inlet opening and to a part of said fan spaced axially from said inlet opening, a baffle within said casing, said baffle being positioned intermediate said parts of said fan, said fan having vanes, and said baffle extending from approximately the radially inner edges of said vanes toward the axis of said fan; and means for receiving a predetermined portion of said falling grains.

9. In an air blower, a housing, a centrifugal fan in said housing, said housing having a circumferential portion surrounding said fan and having end portions at the axial ends of said fan, at least one of said end portions having an inlet opening surrounding the axis of said fan, said inlet opening serving to feed air both to a first part of said fan relatively adjacent said inlet opening and to a second part of said fan spaced axially from said inlet opening, said circumferential portion having an outlet opening from which said fan discharges substantially all of the air coming from said inlet opening, directly from said parts of said fan through said outlet opening, and baffle means within said housing, said baffle means being so constructed and arranged that the major part of the air fed to said second part is caused to proceed in a generally radially outward direction between said baffle means and said inlet opening before proceeding to said second part.

10. In an air blower, a housing, a centrifugal fan in said housing, an inlet opening in said housing, said inlet opening serving to feed air both to a part of said fan relatively adjacent said inlet opening and to a part of said fan spaced axially from said inlet opening, a baffle within said housing, said baffle being positioned intermediate said parts of said fan, said fan having vanes of substantially uniform radial width at least from said baffle to said inlet opening, and said baffle extending from approximately the radially inner edges of said vanes toward the axis of said fan, and said inlet opening having a margin spaced from the axis of said fan approximately the same distance as the radially inner edges of said vanes, said fan being so constructed and arranged as to leave an unobstructed passage extending in a substantially axial direction from said margin to said baffle.

11. In an air blower, a housing, a centrifugal fan in said housing, inlet openings in opposite sides of said housing surrounding the axis of said fan, baffle means within said housing extending approximately from the radially inner edges of the vanes of said fan to substantially the axis thereof, said baffle means having opposite surfaces spaced from each other and from said openings respectively and being so constructed and arranged that the flow of air from said inlet openings to that part of said vanes between the general planes defined by said surfaces is materially altered, and a discharge opening in said housing.

12. In an air blower, a housing, a centrifugal fan in said housing, inlet openings in opposite sides of said housing surrounding the axis of said fan, baffles, within said housing, spaced axially from said openings and from each other, said baffles extending approximately from the radially inner edges of the vanes of said fan to substantially the axis thereof, and a discharge opening in said housing.

13. In an air blower: housing means; a centrifugal fan in said housing means, said fan having generally radial vanes spaced from the axis of said fan; said housing means having a circumferential portion surrounding said fan and having end portions at the axial ends of said fan, at least one of said end portions having an inlet opening surrounding the axis of said fan; said circumferential portion having an outlet opening extending continuously from one axial end of said fan to the other; and means displaced from the axial center of said fan for retarding the flow of air axially inward through said inlet opening in the space radially within said vanes.

14. In an air blower: housing means; a centrifugal fan in said housing means, said fan having generally radial vanes spaced from the axis of said fan; said housing means having a circumferential portion surrounding said fan and having end portions at the axial ends of said fan, at least one of said end portions having an inlet opening surrounding the axis of said fan; said circumferential portion having an outlet opening extending continuously from one axial end of said fan to the other; said fan being of a type normally propelling air out of said outlet opening at smaller velocity at the axial ends of said opening than at the axial center of said opening; and means displaced from the axial center of said fan for retarding the flow of air axially inward through said inlet opening in the space radially within said vanes.

ARTHUR L. JOHNSON.